US011507702B2

(12) United States Patent
Fishel et al.

(10) Patent No.: US 11,507,702 B2
(45) Date of Patent: Nov. 22, 2022

(54) SECURE MODE SWITCHING IN NEURAL PROCESSOR CIRCUIT

(71) Applicant: Apple Inc., Cupertino, CA (US)

(72) Inventors: Liran Fishel, Raanana (IL); Zhimin Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 447 days.

(21) Appl. No.: 16/674,909

(22) Filed: Nov. 5, 2019

(65) Prior Publication Data

US 2021/0133361 A1    May 6, 2021

(51) Int. Cl.
G06F 21/74 (2013.01)
G06F 9/54 (2006.01)
G06F 21/57 (2013.01)
G06N 3/063 (2006.01)

(52) U.S. Cl.
CPC .............. *G06F 21/74* (2013.01); *G06F 9/546* (2013.01); *G06F 21/57* (2013.01); *G06N 3/063* (2013.01)

(58) Field of Classification Search
CPC .......... G06F 21/74; G06F 9/546; G06F 21/57; G06N 3/063
See application file for complete search history.

(56) References Cited

U.S. PATENT DOCUMENTS

| 8,978,132 B2 | 3/2015 | Henry et al. | |
| 2009/0205050 A1* | 8/2009 | Giordano | G06F 21/71 |
| | | | 711/159 |
| 2011/0067110 A1* | 3/2011 | Markey | G06F 21/74 |
| | | | 712/229 |
| 2018/0129893 A1* | 5/2018 | Son | G06N 3/063 |
| 2018/0189642 A1* | 7/2018 | Boesch | G06F 30/34 |
| 2018/0330229 A1 | 11/2018 | Shirahata | |
| 2019/0370631 A1* | 12/2019 | Fais | G06N 3/063 |

(Continued)

FOREIGN PATENT DOCUMENTS

| EP | 3637258 A1 | 4/2020 |
| WO | WO 2019/007406 A1 | 1/2019 |
| WO | WO 2019/073000 A1 | 4/2019 |

OTHER PUBLICATIONS

Gu, Z. et al., "Securing Input Data of Deep Learning Inference Systems via Partitioned Enclave Execution," arXiv: 1807.00969, Jul. 3, 2018, pp. 1-14.

(Continued)

*Primary Examiner* — Shanto Abedin
*Assistant Examiner* — Alan Lingqian Kong
(74) *Attorney, Agent, or Firm* — Fenwick & West LLP

(57) ABSTRACT

Embodiments relate to switching a neural processor circuit between non-secure and secure modes. A security controller of the neural processor circuit indicates that a transition from the non-secure mode to the secure mode is to occur. The security controller waits for a neural task manager of the neural processor circuit to clear out any existing non-secure tasks in queues. After the existing non-secure mode tasks are cleared, the security controller switches the neural processor circuit to the secure mode. While in the secure mode, secure tasks are added to one or more queues and executed, and data for processing in the neural processor circuit is received from a secure source. The neural processor circuit may to transition back to the non-secure mode when all secure mode tasks are completed.

20 Claims, 7 Drawing Sheets

(56) References Cited

U.S. PATENT DOCUMENTS

2019/0392194 A1* 12/2019 Croxford ............... G06V 20/64
2020/0043123 A1* 2/2020 Dash ..................... G06F 9/3851

OTHER PUBLICATIONS

PCT International Search Report and Written Opinion, PCT Application No. PCT/US2020/052054, Feb. 3, 2021, 17 pages.
Tramer, F. et al., "Slalom: Fast, Verifiable and Private Execution of Neural Networks in Trusted Hardware," arXiv: 1806.03287, Jun. 8, 2018, pp. 1-15.

* cited by examiner

SECURE MODE SWITCHING IN NEURAL PROCESSOR CIRCUIT

BACKGROUND

1. Field of the Disclosure

The present disclosure relates to a circuit for performing operations related to neural networks, and more specifically to a neural engine switching between a non-secure mode and a secure mode.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of a central processing unit (CPU) as well as increase the overall power consumption.

SUMMARY

Embodiments relate to a neural processor circuit with a security controller that causes components in the neural processor circuit to switch from a non-secure mode to a secure mode. The neural processor circuit may include one or more neural engine circuits for performing convolution operations on input data using kernel coefficients, an input interface circuit for receiving input data, and a kernel interface circuit between the neural engine circuits. One or more of the input interface circuit and the kernel interface circuit receives data from a first source (e.g., a non-trusted zone of the system memory) in the non-secure mode, and a second source (e.g., a trusted zone of the system memory) in the secure mode.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to switching a neural processor circuit between non-secure and secure modes. A security controller of the neural processor circuit indicates that a transition from the non-secure mode to the secure mode is to occur. The security controller waits for a neural task manager of the neural processor circuit to clear out any existing non-secure tasks in queues. After the existing non-secure mode tasks are cleared, the security controller switches the neural processor circuit to the secure mode. While in the secure mode, secure mode tasks are added to one or more queues and executed, and data for processing in the neural processor circuit is received from a secure source. The neural processor circuit may to transition back to the non-secure mode when all secure mode tasks are completed.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

Figure 1:
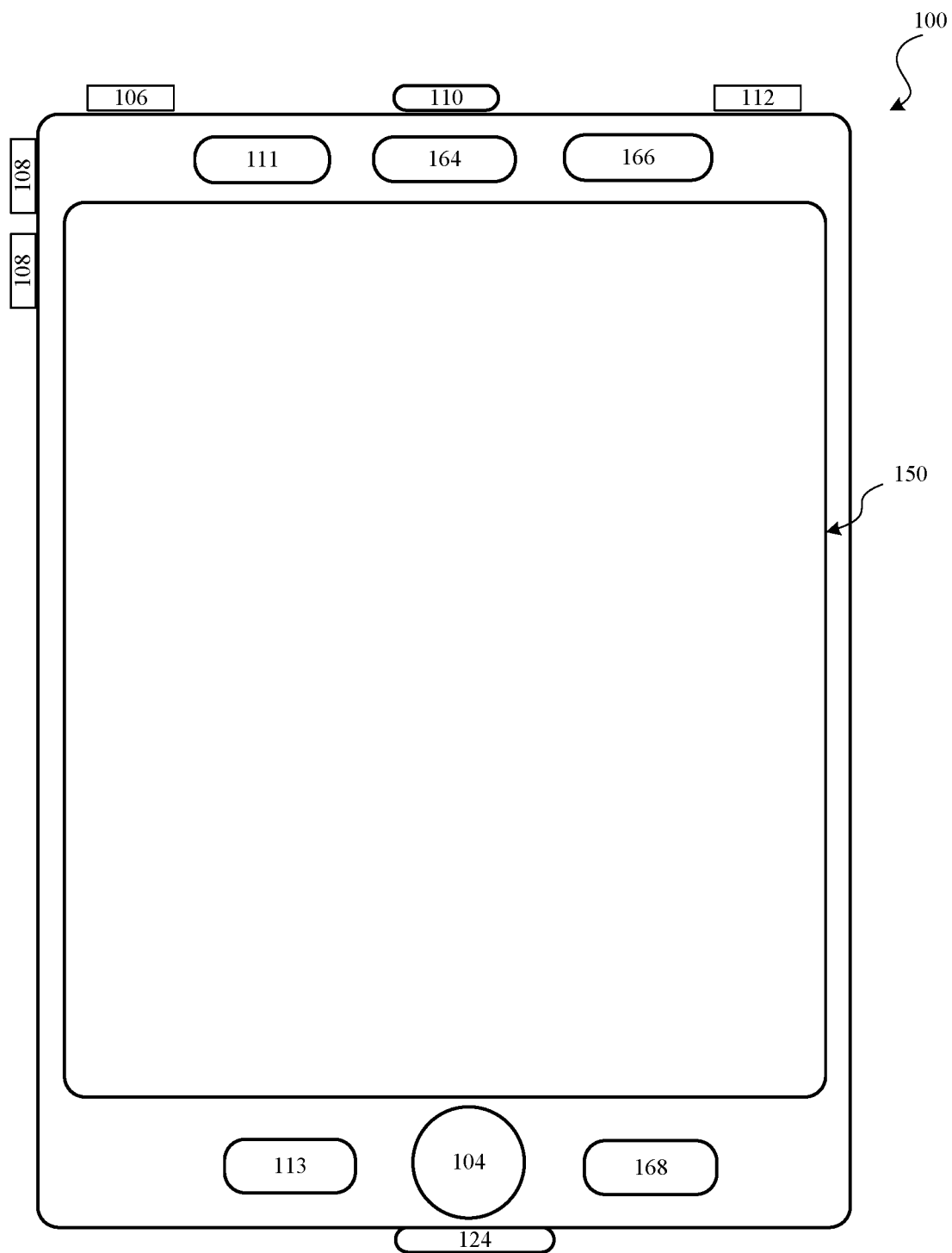
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
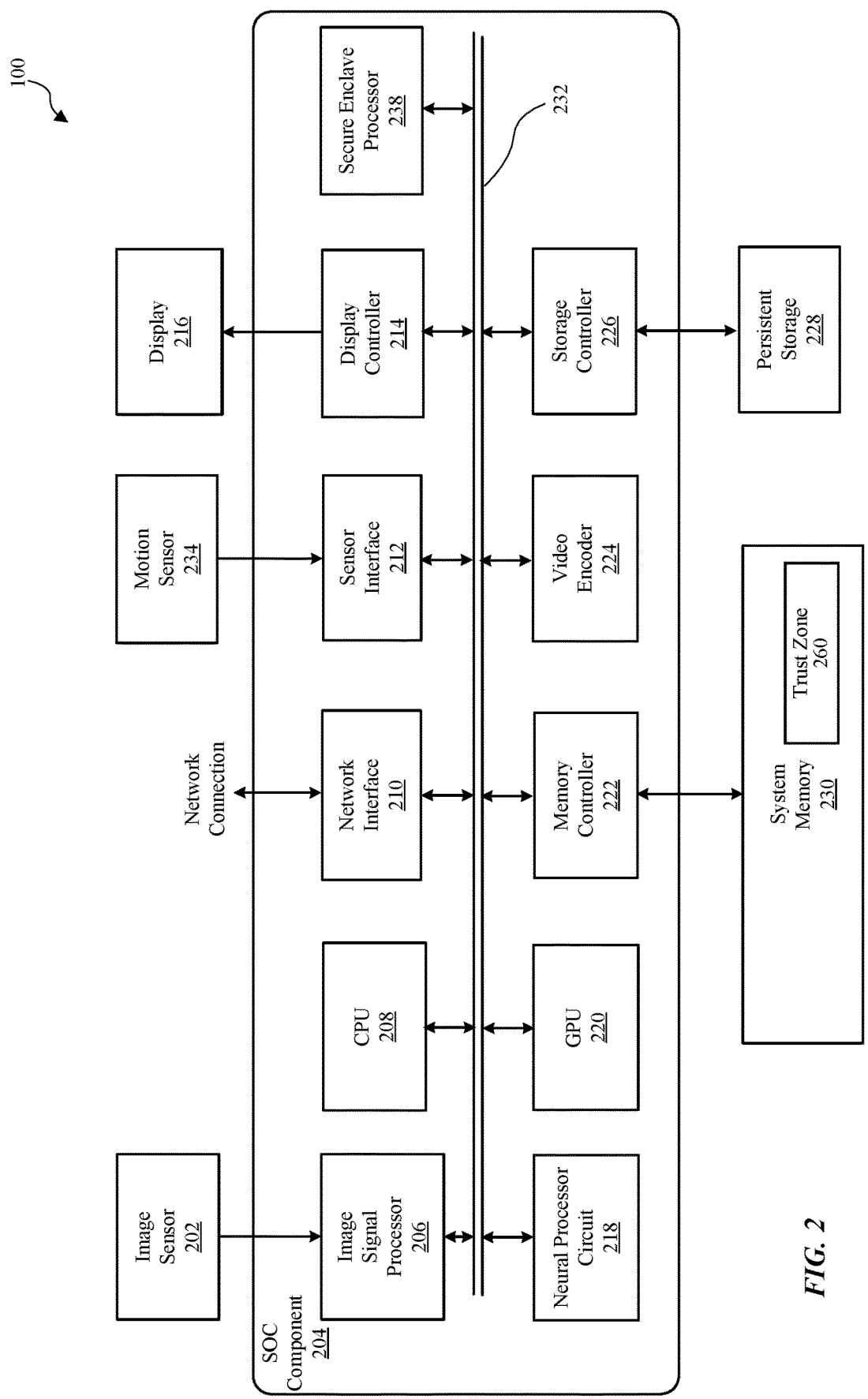
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. System memory 230 has a portion set up as trust zone 260 used for storing data used in a secure mode. Trust zone 260 is a section of system memory 230 that stores data for access in the secure mode.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

Secure Enclave Processor (SEP) 238 is a processor separate from CPU 220. SEP 238 may be isolated from the rest of the SOC component 204 except for certain-controlled interfaces. Because the interfaces to SEP 238 are controlled tightly, direct access to the SEP 238 by CPU 208 may be prevented. SEP 238 is an example of a security circuit that performs one or more secure services for the other components in SOC 204. That is, a component may transmit a request for a secure service to the security circuit, which may perform the secure service and return a result to the requestor. Secure services may include any services related to ensuring the protection of certain types of data (e.g., private data) and/or preventing the unauthorized use of the system including SOC 204. SEP 238 may allocate the portion of system memory 230 that is to be used for trust zone 260 when electronic device 100 is booted.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tan h), and rectified linear unit functions (ReLU). After a batch of data of training samples passes through a neural network in the forward propagation, the results may be compared to the training labels of the training samples to compute the network's loss function, which represents the performance of the network. In turn, the neural network performs back-propagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
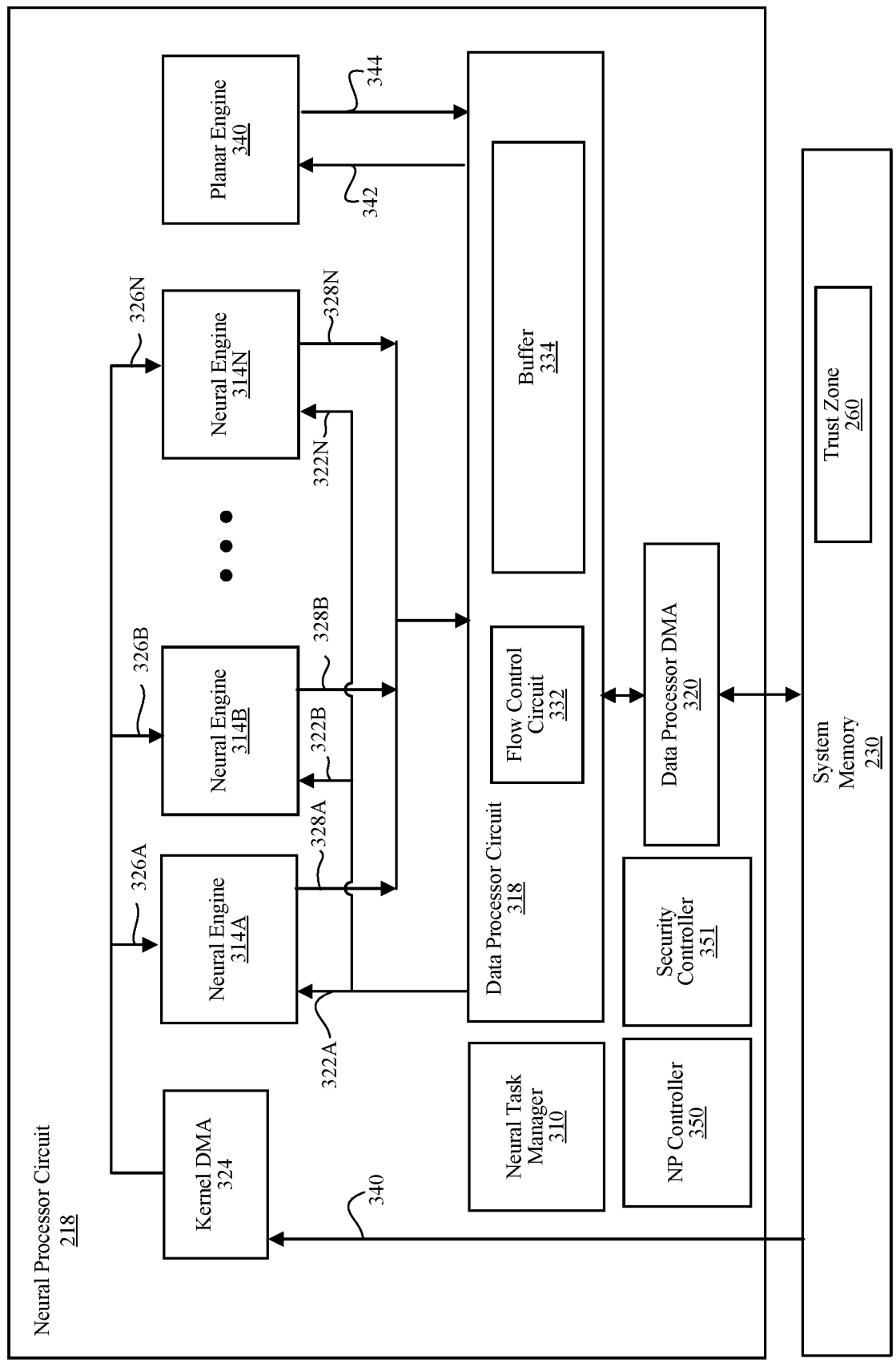
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, data processor DMA 320, planar engine 340, neural processor (NP) controller 350, and security controller 351. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduce a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a flow control circuit 332 and a buffer 334. Buffer 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The input data may be transmitted from trust zone 260 of system memory 230 when neural processor circuit 218 is in the secure mode, and may be transmitted from a non-trust zone of system memory 230 when neural processor circuit 28 is in the non-secure mode. The data stored in data processor circuit 318 may include different subsets that are sent to various downstream components, such as neural engines 314 and planar engine 340.

In one embodiment, buffer 334 is embodied as a non-transitory memory that can be accessed by neural engines 314 and planar engine 340. Buffer 334 may store input data 322A through 322N for feeding to corresponding neural engines 314A through 314N or planar engine 340, as well as output data 328A through 328N from each of neural engines 314A through 314N or planar engine 340 for feeding back into one or more neural engines 314 or planar engine 340, or sending to a target circuit (e.g., system memory 230). Buffer 334 may also store input data 342 and output data 344 of planar engine 340 and allow the exchange of data between neural engine 314 and planar engine 340. For example, one or more output data 328A through 328N of neural engines 314 are used as the input 342 to planar engine 340. Likewise, the output 344 of planar engine 340 may be used as the input data 322A through 322N of neural engines 314. The inputs of neural engines 314 or planar engine 340 may be any data stored in buffer 334. For example, in various operating cycles, the source datasets from which one of the engines fetches as inputs may be different. The input of an engine may be an output of the same engine in previous cycles, outputs of different engines, or any other suitable source datasets stored in buffer 334. Also, a dataset in buffer 334 may be divided and sent to different engines for different operations in the next operating cycle. Two datasets in buffer 334 may also be joined for the next operation.

Flow control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Flow control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes.

The data of neural processor circuit 218 stored in buffer 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a segment of the input data from a source (e.g., system memory 230) for storing in buffer 334, and a write circuit that forwards data from buffer 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer 334 may be a direct memory access buffer that stores data of a machine learning model of device 100 without involvement of CPU 208.

Neural Processor (NP) controller 350 is a control circuit that performs various operations to control the overall operation of neural processor circuit 218. NP controller 350 may interface with CPU 208, program components of neural processor circuit 218 by setting register in the components and perform housekeeping operations. NP controller 350 may also initialize components in neural processor circuit 218 when neural processor circuit 218 is turned on.

Security controller 351 is a control circuit that performs operations associated with the secure mode. Security controller 351 is also protected from unauthorized access through CPU 208. For example, security controller 351 may always operate in a secure domain. Security controller 351 is separate from NP controller 350, and interfaces with secure enclave processor 238. Security controller 351 may perform various operations, including, but not limited to, programming components in neural processor circuit 218 to transition from a non-secure mode to a secure mode or transition to a non-secure mode from a secure mode, coordinate operations of components of neural processor circuit 218 in the secure mode, and execute various secure-mode tasks. For example, security controller 351 instructs NP controller 250 to begin a transition to or from a secure mode, and confirms that neural processor circuit 218 is in an idle state before transitioning to or from a secure mode.

Example Neural Engine Architecture

Figure 4:
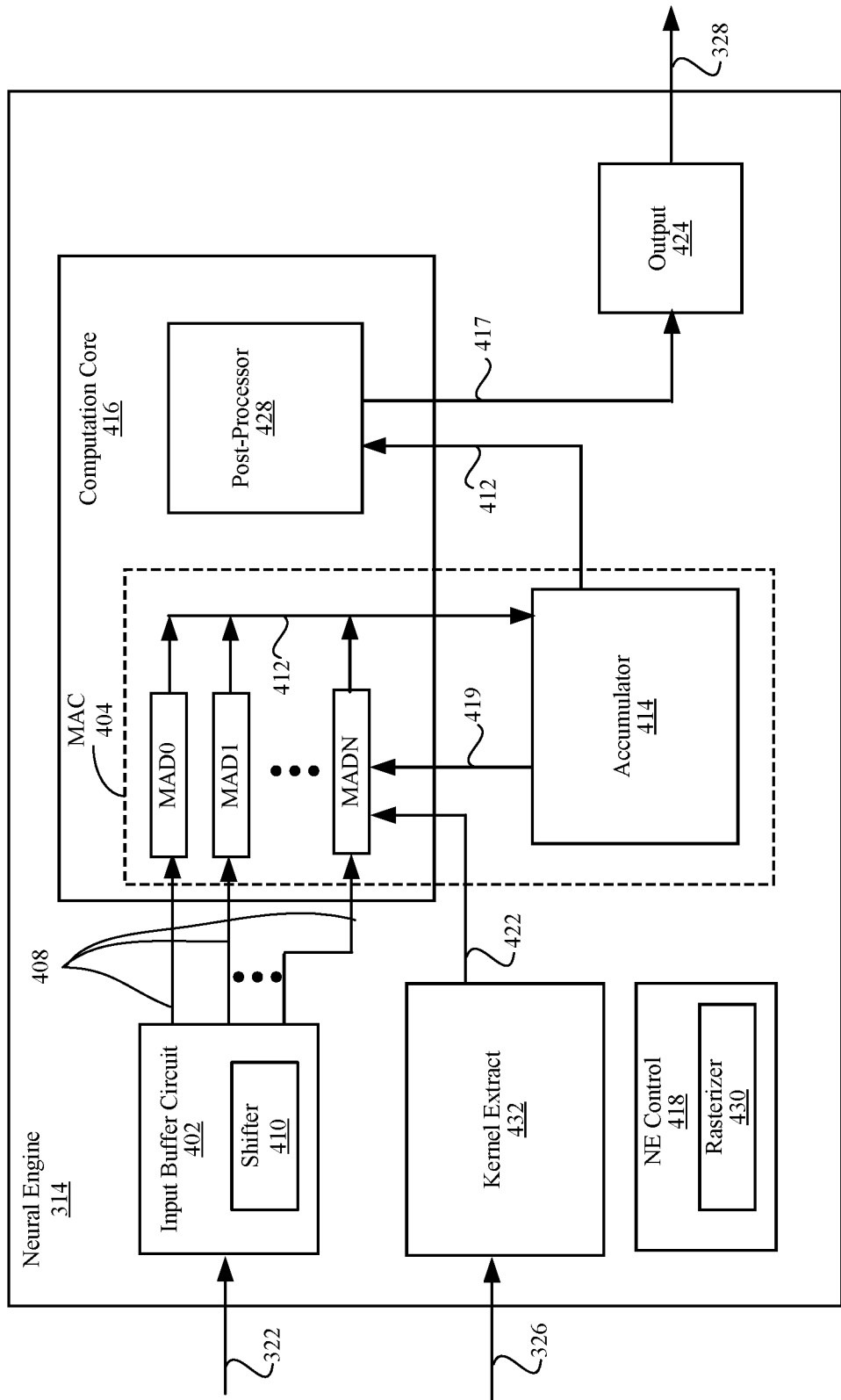
FIG. 4 is a block diagram of a neural engine in the neural processor circuit, according to one embodiment.

FIG. 4 is a block diagram of neural engine 314, according to one embodiment. Neural engine 314 performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to the MAC circuit while data stored in a second subunit of accumulator 414 is sent to post-processor 428.

Post-processor 428 is a circuit that performs further processing of values 412 received from accumulator 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator 414 may be sent directly to output circuit 414 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through the MACs 404 and accumulator 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to data buffer 334. Other components of neural processor circuit 218 (e.g., kernel DMA 324, buffer DMA 320, data buffer 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Planar Engine

Figure 5:
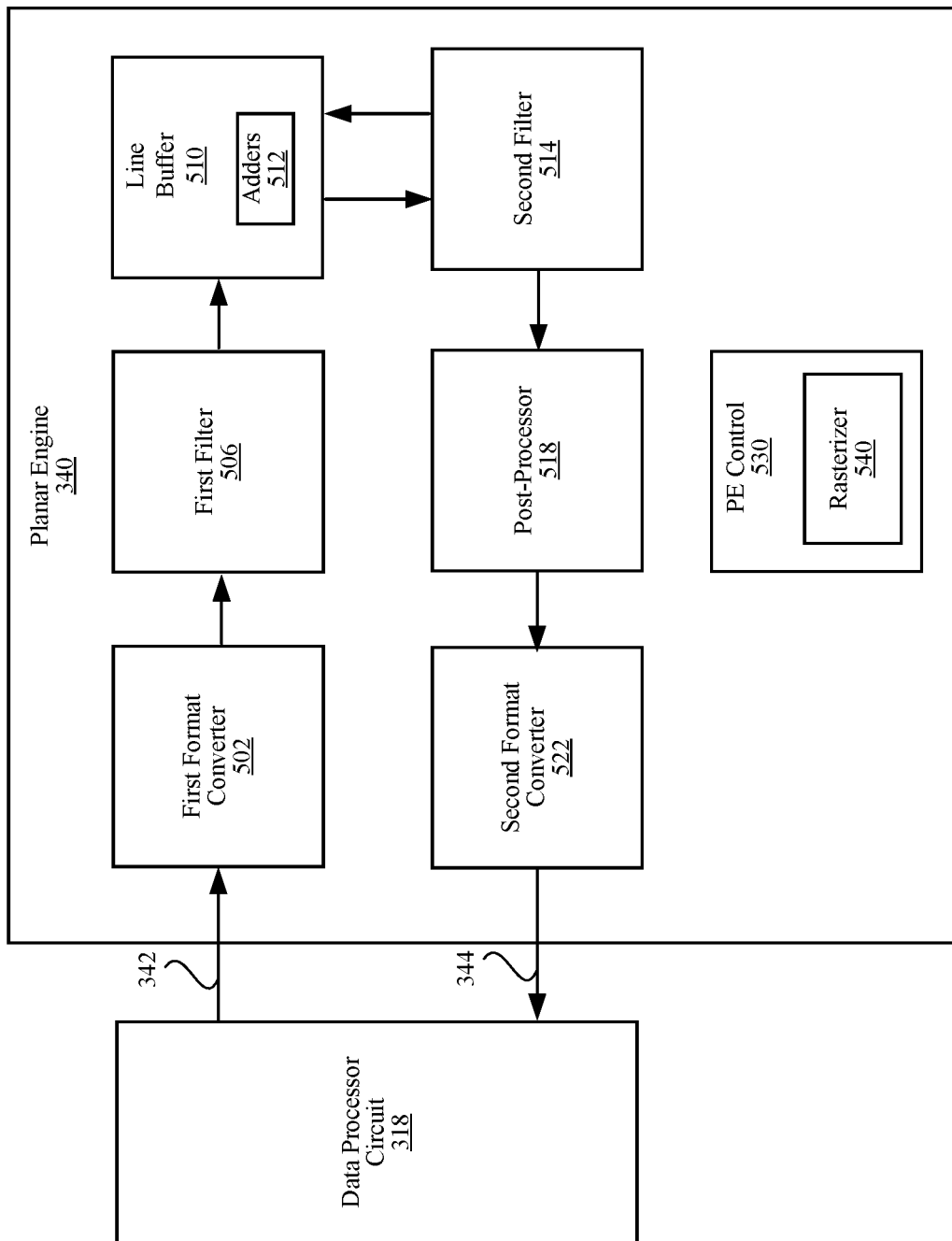
FIG. 5 is a conceptual diagram illustrating loops for processing input data at the neural processor circuit, according to one embodiment.

FIG. 5 is a block diagram of planar engine 340, according to one embodiment. Planar engine 340 is a circuit that is separated from the plurality of neural engines 314 and can be programmed to perform in different modes of operations. For example, planar engine 340 may operate in a pooling mode that reduces the spatial size of data, in a reduction mode that reduces the rank of a tensor, in a gain-and-bias mode that provides a single-pass addition of bias and scaling by a scale factor, and in an elementwise mode that includes elementwise operations. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processor 518, a second format converter 522, and a planar engine (PE) control 530 (includes rasterizer 540). Planar engine 340 may include fewer components or further components not illustrated in FIG. 5. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. For example, in an elementwise mode that involves the addition of two different tensors to derive a resultant tensor, the input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 in one format (e.g., a format used for storing in buffer 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In a reduction mode, for example, first filter 506 performs elementwise operations while second filter 514 functions as a reduction tree to aggregate values of data.

Post-processor 518 is a circuit that performs further processing of values fetched from other upstream components. Post-processor 518 may include specialized circuits that are efficient at performing certain types of mathematical computations that might be inefficient to perform using a general computation circuit. Operations performed by post-processor 518 may include, among others, performing square root operations and inverse of values in a reduction mode. Post-processor 518 may be bypassed in other operation modes.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed at by first filter 506 may be stored in line buffer 510 and then be read by second filter 514 for further filtering. In the reduction mode, however, data is processed by first filter 506, then processed at second filter 514 and then accumulated in line buffer 510 that is programmed as an accumulator. In the elementwise mode, line buffer 510 may be bypassed.

PE control 530 also includes a rasterizer 540 that tracks the current task or process loop being processed at planar engine 340. Rasterizer 540 is a circuit that tracks units or segments of input data and/or loops for processing the input data in planar engine 340. Rasterizer 540 may control the fetch of segments to planar engine 340 in each operation cycle and may monitor the size and rank of each segment being processed by planar engine 340. For example, smaller segments of a dataset may be fetched as input data 342 in a raster order for processing at planar engine 340 until all segments of the source dataset are processed. In fetching the segments, rasterizer 540 monitors the coordinate of the segment in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such case, planar engine 340 fetches different segments of the dataset as input data 342 in multiple operating cycles. The fetched segment may partly overlap with a previously fetched segment and/or a next segment to be fetched. In one embodiment, the portion of overlapping data is fetched only once and reused to reduce the time and power consumption cost of planar engine 340 in fetching data.

Example Task Management

Figure 6:
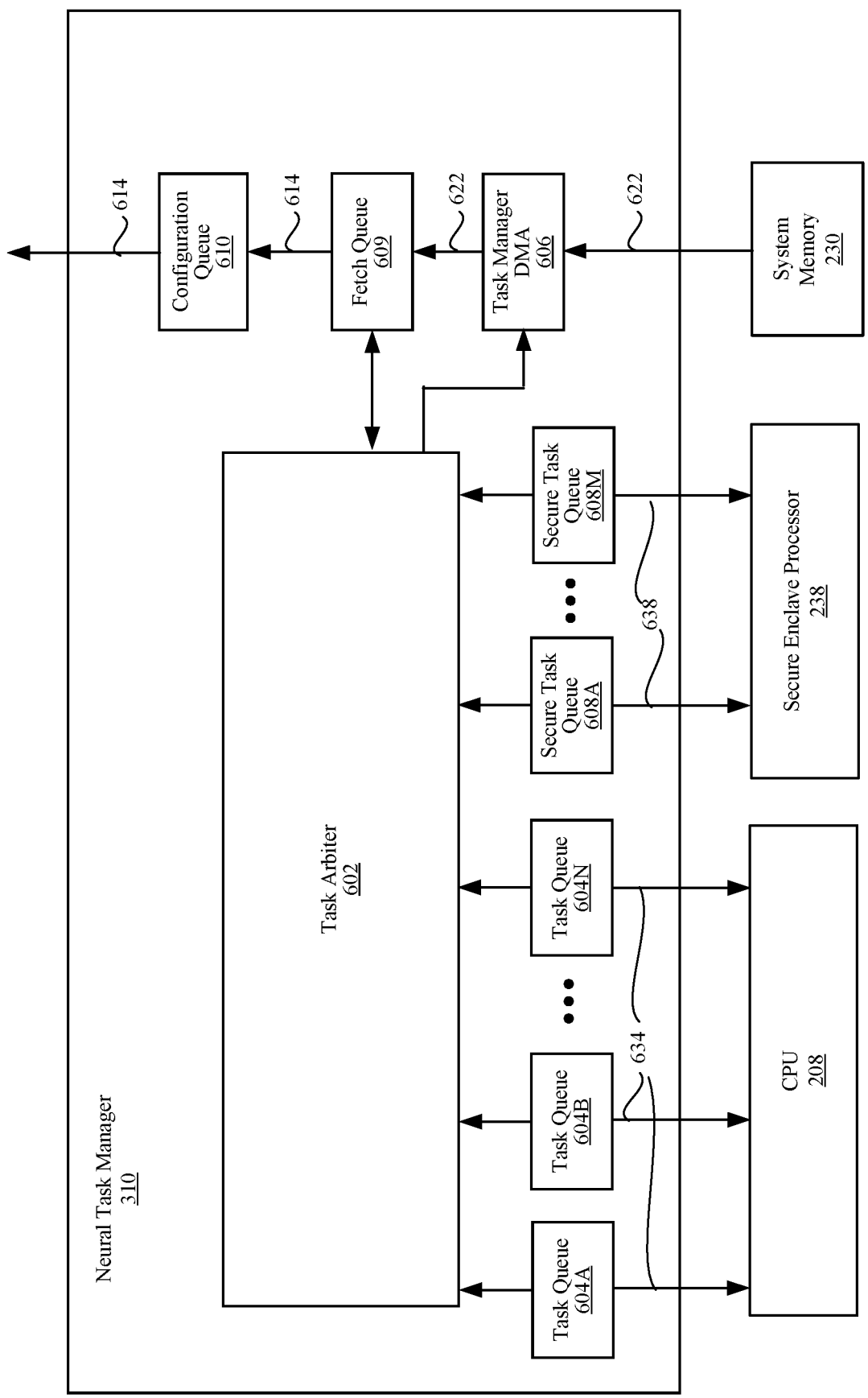
FIG. 6 is a block diagram of a neural task manager in the neural processor circuit, according to one embodiment.

FIG. 6 is a block diagram of neural task manager 310 in neural processor circuit 218, according to one embodiment. Neural task manager 310 may include, among other components, a task arbiter 602, task queues 604A through 604N (hereinafter collectively referred as "task queues 604" and individually also referred to as "task queue 604"), secure task queues 608A through 608M (hereinafter collectively referred to as "secure task queues 608" and individually also referred to as "secure task queue 608"), a task manager direct memory access (DMA) 606, a fetch queue circuit 609, and a configuration queue circuit 610. Neural task manager 310 may include other components not illustrated in FIG. 6.

Task arbiter 602 is a circuit or a combination of circuit and firmware that selects tasks from task queues 604, 608 for execution by neural processor circuit 218. Task arbiter 602 dequeues tasks from the task queues 604, 608, and places tasks in configuration queue circuit 610. While a task is in configuration queue circuit 610, it is committed to execution and neural processor circuit 218 performs a prefetch for input data and kernel data before the task is executed by other components of neural processor circuit 218. For example, task arbiter 602 may perform fixed-priority arbitration between multiple task queues 604, and select task from the task queues 604 with the highest priority for retrieval of a task descriptor 622 from the system memory 230 by the Task Manager DMA 606.

Each task queue 604 is coupled to the CPU 208 and the task arbiter 602 to store and send a reference to a non-secure task list 634 associated with non-secure mode tasks. Conversely, each secure task queue 608 is coupled to secure enclave processor 238 and the task arbiter 602 to store and send a reference to a secure task list 638 associated with secure tasks. When notified by security controller 351 that neural processor circuit 218 is transitioning to a secure mode, neural task manager 310 may determine whether task queues 604 are empty, and may notify security controller 351 that the task queues 604 are empty, which may be a prerequisite for the transition. Similarly, when notified by security controller 351 that neural processor circuit 218 is transitioning from a secure mode to a non-secure mode, neural task manager 310 may determine whether secure task queues 608 are empty, and may notify security controller 351 that the secure task queues 608 are empty. The reference stored in each queue 604, 608 may include a set of pointers and counters pointing to the respective task list including the task descriptors 622 in the system memory 230. Each task queue 604 or secure task queue 608 may be further associated with a priority parameter that defines the relative priority of the task queues 604, or the secure task queues 608. The task descriptor 622 of a task specifies a configuration of the neural processor circuit 218 for executing the task.

Task manager DMA 606 is coupled to task arbiter 602, system memory 230, and fetch queue circuit 609. Task manager DMA 606 includes a read circuit that receives task descriptors 622 of tasks from a source (e.g., system memory 230) for storing in fetch queue circuit 609. In the non-secure mode, task arbiter 602 selects a task queue 604 according to the priorities of task queues 604 and uses the task list referenced by the selected task queue 604 (or secure task queue 608) to control the Task Manager DMA 606 to select the task descriptor 622 of a task. In the secure mode, task arbiter 602 selects a secure task queue 608 according to the priority of secure task queues 608.

Fetch queue circuit 609 is a single entry queue that stores a task descriptor 622 of a task that is pending to commit for execution. Fetch queue circuit 609 is coupled to task manager DMA 606 to receive task descriptor 622 from system memory 230, and provides the task descriptor 614 to configuration queue circuit 610, or configuration data 614 extracted from task descriptor 622 to configuration queue circuit 610.

Configuration queue circuit 610 circuit holds configuration data 614 of multiple tasks that have been committed for execution. When a task is in configuration queue circuit 610, kernel DMA 324 may fetch kernel data from system memory 230 to store in kernel extract circuit 432 of neural engines 314, and buffer DMA 320 may fetch input data from system memory 230 to store in data buffer 318. To execute the task, kernel extract circuit 432 provides the prefetched kernel data to MAC 404 of neural engine 314, and data buffer 318 provides prefetched input data to MAC 404 of neural engine 314. In some embodiments, configuration queue circuit 610 may include multiple queues that holds configuration data 614 extracted from the committed task descriptors 622.

Example Process of Switching to and from Security Mode

Figure 7:
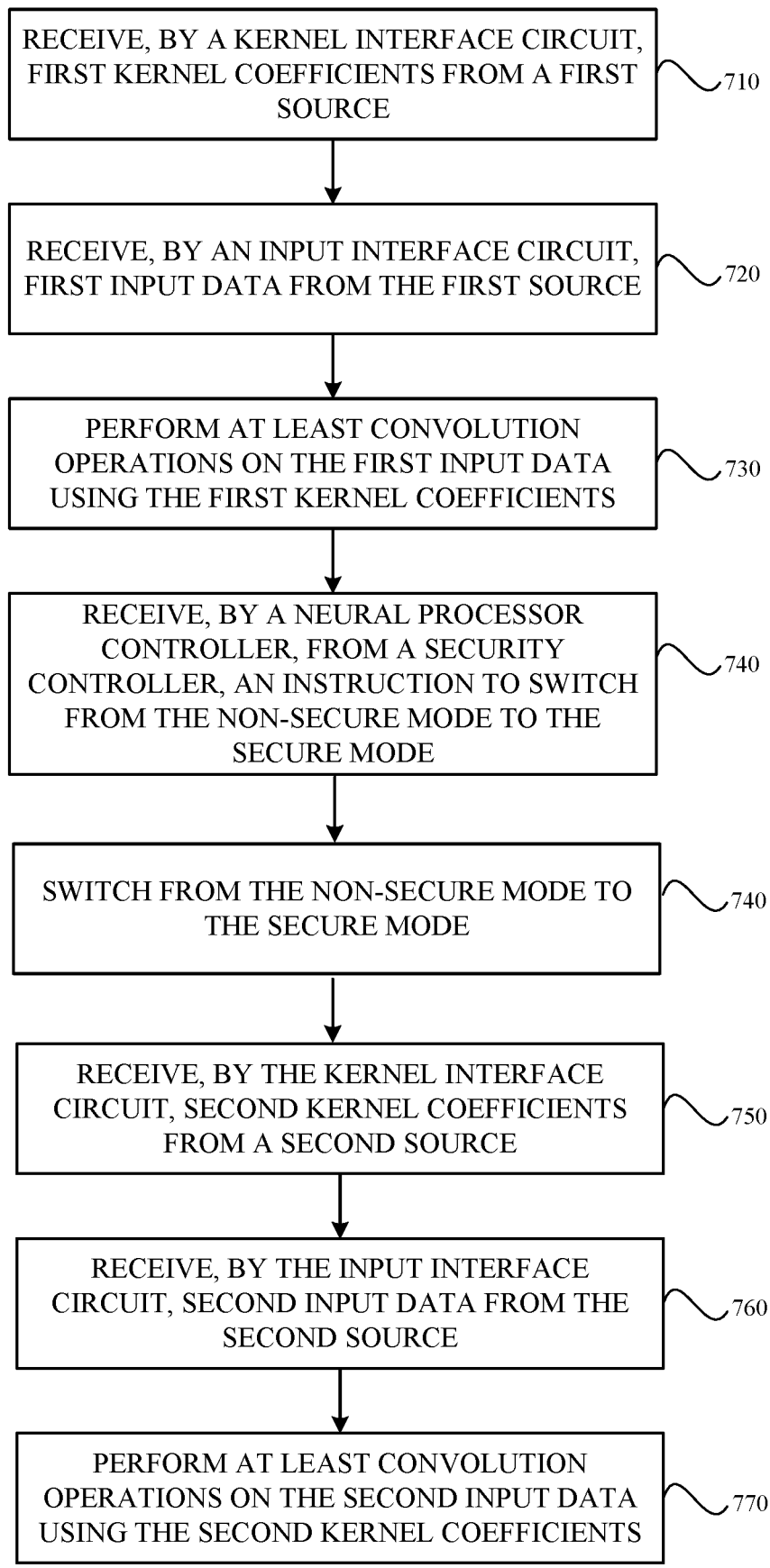
FIG. 7 is a flowchart illustrating a method of switching a neural processor from a non-secure mode to a secure mode, according to one embodiment.

FIG. 7 is a flowchart illustrating a method of switching a neural processor from the non-secure mode to the secure mode, according to one embodiment. Neural processor circuit 218 may initially be placed in the non-secure mode. While in the non-secure mode, a kernel interface circuit (e.g., kernel DMA 324) of neural processor circuit 218 receives 710 first kernel coefficients from a first source (e.g., non-trust zones of system memory 230), and an input interface circuit (e.g., data processor DMA 320) of neural processor circuit 218 also receives 720 second kernel coefficients from the first source. Then, convolution operations are performed 730 on the first input data using the first kernel coefficients. Neural processor circuit 218 is prevented from accessing data from trust zone 360 while in the non-secure mode.

Secure enclave processor 238 initiates switching from the non-secure mode to the secure mode, for example, by setting a bit flag in memory of security controller 351 that indicates the transition to secure mode for the secure mode. In an embodiment, in order to determine whether to initiate the switch, secure enclave processor 238 polls (e.g., periodically), security controller 351 to query whether a switch to the secure mode should occur, and sets the bit flag in security controller 351 responsive to an instruction from security controller 351 to do so being received as a reply to the polling. In an alternative embodiment, in order to determine whether to initiate the switch, secure enclave processor 238 transmits a request to switch to the secure mode to security controller 351, and when the transition to the secure mode is complete, secure enclave processor 238 receives an interrupt from security controller 351 acknowledging that the transition to the secure mode is complete. Secure enclave processor 238 may verify that neural engines 314 are awake and operational prior to setting the bit flag.

Security controller 351 confirms that neural processing circuit 218 is idle or that all tasks in the task queues 604 are purged before switching the neural processor circuit 218 to the secure mode. To confirm that neural processing circuit 218 is idle, security controller 351 may instruct neural task manager 310 to alert security controller 351 when tasks in task queues 604 are complete or the tasks are purged. Tasks may be purged, e.g., where a task of a secure task queue 608 has higher priority than the incomplete tasks in task queues 604. After receiving a notification from neural task manager 310 of completion or purging of the tasks, NP controller 350 of neural processor circuit 218 receives, from security controller 351, an instruction to switch from the non-secure mode to the secure mode. Additionally, secure enclave processor 238 may instruct neural processor circuit 218 (e.g., by directing the instruction to a power manager of the neural processor circuit) not to reset or reduce its operating power supply when in the secure mode or transitioning to the secure mode (e.g., due to security risks that would be introduced by a reset or a reduction in power while transitioning to, or in, the secure mode). Security controller 351 then switches 740 neural processor circuit 218 from the non-secure mode to the secure mode, and notifies secure enclave processor 238 that neural processor circuit 218 is in the secure mode. While in the secure mode, secure enclave processor 238 drives operations of the neural processor circuit 218.

While in the secure mode, the kernel interface circuit of neural processor circuit 218 receives 750, second kernel coefficients from a second source (e.g., trust zone 630). The input interface circuit of neural processor circuit 218 also receives 760 second input data from the second source. Neural processor circuit 218 performs 770 convolution operations on the second input data using the second kernel coefficients. While in the secure mode, secure enclave processor 238 sends secure task list to neural task manager 310. In the secure mode, CPU 208 is blocked from accessing neural processor circuit 218.

The data flow illustrated in FIG. 7 is exemplary and non-exhaustive; different implementations of the data flow are within the scope of this disclosure. Elements 710, 720, and 730 may be executed in parallel, or in any order. As an example, the input interface circuit may receive 720 the second kernel coefficients from the first source before the kernel interface circuit receives 710 the first kernel coefficients from the first source. Similarly, elements 750, 760, and 770 may be executed in parallel, or in any order. Thus, a similar reversal of operations may occur with respect to receiving 750 second kernel coefficients and receiving 760 second input data. Moreover, elements 710, 720, and 730 are optional, as the non-secure mode is a state regardless to the actual processing at a certain time; the neural processor circuit may switch to a secure mode without ever processing a non-secure network.

Neural processor circuit 218 may switch from the secure mode back to the non-secure mode in a similar manner to switching from the non-secure mode to the secure mode except that a bit flag that indicates a transition to a non-secure mode is set, rather than to a secure mode, and that the bit flag is set when secure task queues 608 are empty (rather than task queues 604). As part of the transition, security controller 351 disables traffic to trust zone 260. After the transition, security controller 351 asserts an interrupt to CPU 208 to notify CPU 208 that neural processor circuit 218 is ready for non-secure tasks. Security controller 351 may also assert an interrupt to secure enclave processor 238 to notify that neural processor circuit 218 are now in a non-secure mode. Then, CPU 208 enables neural task manager 310 to load a non-secure task list into its task queues 604.

In one or more embodiments, after being reset, neural processor circuit 218 wakes up in the non-secure mode. If neural processor circuit 218 is to perform secure tasks, security controller 351 clears various buffers and other storage components (e.g., buffer 334, input buffer circuit 402, accumulator 414) in neural processor circuit 218 at reset, and transmits a notification to CPU 208 that the memory has been cleared. The CPU, and other non-secure components, cannot access neural processor 218 during the reset and clearing process, and regains such access responsive to receiving the notification that the memory has been cleared. To notify the CPU, security controller 351 may set a status bit flag that indicates that the buffers and other storage components has been cleared.

In one or more embodiments, secure enclave processor 238 notifies an operating system of electronic device 100 if switching to or from the secure mode is not completed with a predetermined amount of time. In response, the operating system may reset entire or part of neural processor circuit 218.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit comprising:
one or more neural engine circuits configured to perform at least convolution operations on input data using kernel coefficients;
a kernel interface circuit between the one or more neural engine circuits and sources including a first source and a second source, the kernel interface circuit configured to:
receive a compressed version of the kernel coefficients from the first source in a non-secure mode, and
receive the kernel coefficients from the second source in a secure mode;
an input interface circuit separate from the kernel interface circuit, the input interface circuit between the one or more neural engine circuits and the sources, the input interface circuit configured to:
receive the input data from the first source in the non-secure mode, and
receive the input data from the second source in the secure mode;
a neural task manager circuit comprising at a non-secure task queue and at least one secure task queue, the non-secure task queue storing non-secure references to a list of non-secure task descriptors in a system memory external to the neural processor circuit, the secure task queue storing references to a list of secure task descriptors in the system memory, each of the non-secure task descriptors indicating a configuration of the neural processor circuit for performing a corresponding non-secure task, each of the secure task descriptors indicating a configuration of the neural processor circuit for performing a corresponding secure task;
a neural processor controller configured to control operations of the one or more neural engine circuits, the kernel interface circuit and the input interface circuit; and
a security controller configured to send an instruction to the neural processor controller to switch from the non-secure mode to the secure mode.

2. The neural processor circuit of claim 1, wherein the security controller is further configured to:
determine whether the non-secure task queue is empty; and
send the instruction to the neural processor controller to switch from the non-secure mode to the secure mode responsive to the non-secure task queue being empty.

3. The neural processor circuit of claim 2, wherein the security controller is further configured to:
responsive to determining that the non-secure task queue is not empty, instruct that one or more tasks in the non-secure task queue to be aborted and empty the non-secure task queue.

4. The neural processor circuit of claim 1, wherein the security controller is further configured to send an instruction to the neural processor controller to switch from the secure mode to the non-secure mode.

5. The neural processor circuit of claim 4, wherein the security controller is further configured to:
determine whether the secure task queue is empty; and
send the instruction to the neural processor controller to switch from the secure mode to the non-secure mode responsive to the secure task queue being empty.

6. The neural processor circuit of claim 1, wherein the neural task manager circuit is configured to execute secure tasks in the secure task queue responsive to receiving acknowledgment that the neural processor controller has switched from the non-secure mode to the secure mode.

7. The neural processor circuit of claim 1, wherein the second source is logically separate from the from the first source.

8. The neural processor circuit of claim 1, wherein the one or more neural engine circuits are further configured to clear respective memory of the one or more neural engine circuits responsive to receiving the instruction to switch from the non-secure mode to the secure mode.

9. The neural processor circuit of claim 1, wherein the security controller is further configured to send the instruction to the neural engine to switch from the non-secure mode to the secure mode responsive to detecting that a bit corresponding to the secure mode has been set.

10. The neural processor circuit of claim 1, wherein the neural processor circuit is reset responsive to the neural processor circuit has not entered the secure mode within a predefined time.

11. The neural processor circuit of claim 1, wherein a secure processor prevents the neural processor circuit from resetting when the neural processor circuit is in the secure mode.

12. The neural processor circuit of claim 1, wherein the neural processor controller is further configured to wake up in the non-secure mode following a reset.

13. A method for switching a neural processor circuit from a non-secure mode to a secure mode, the method comprising:
storing, in a non-secure task queue of a neural task manager circuit in the neural processor circuit, non-secure references to a list of non-secure task descriptors in a system memory external to the neural processor circuit, each of the non-secure task descriptors indicating a configuration of the neural processor circuit for performing a corresponding non-secure task;
receiving, by a kernel interface circuit between one or more neural engine circuits and sources including a first source and a second source, while the neural processor circuit is in the non-secure mode, a compressed version of first kernel coefficients from the first source;
receiving, by an input interface circuit, while the neural processor circuit is in the non-secure mode, first input data from the first source, the input interface circuit separate from the kernel interface circuit, and between the one or more neural engine circuits and the sources;
performing, by the one or more neural engine circuits, at least convolution operations on the first input data using the first kernel coefficients;
storing, in a secure task queue of a neural task manager circuit in the neural processor circuit, secure references to a list of secure task descriptors in the system memory, each of the secure task descriptors indicating a configuration of the neural processor circuit for performing a corresponding secure task;

receiving, by a neural processor controller of the neural processor circuit, from a security controller of the neural processor circuit, an instruction to switch from the non-secure mode to the secure mode;

switching from the non-secure mode to the secure mode;

receiving, by the kernel interface circuit, while the neural processor circuit is in the secure mode, a compressed version of the second kernel coefficients from the second source;

receiving, by the input interface circuit, while the neural processor circuit is in the secure mode, second input data from the second source; and performing, by the one or more neural engine circuits, at least convolution operations on the second input data using the second kernel coefficients.

14. The method of claim 13, further comprising:
determining, by the security controller, whether the non-secure task queue is empty; and
sending, by the security controller, the instruction to the neural processor controller to switch from the non-secure mode to the secure mode responsive to determining that the non-secure task queue is empty.

15. The method of claim 14, further comprising:
responsive to determining that the non-secure task queue is not empty, instructing, by the security controller, that one or more tasks in the non-secure task queue be aborted and that the non-secure task queue be emptied.

16. The method of claim 13, further comprising sending, by the security controller, an instruction to the neural processor controller to switch from the secure mode to the non-secure mode.

17. The method of claim 16, further comprising:
determining, by the security controller, whether the secure task queue is empty; and
sending, by the security controller, the instruction to the neural processor controller to switch from the secure mode to the non-secure mode responsive to the secure task queue being empty.

18. The method of claim 13, further comprising:
executing, by the neural task manager circuit, secure tasks in a secure task queue responsive to receiving acknowledgment that the neural processor controller has switched from the non-secure mode to the secure mode.

19. An electronic device, comprising:
a memory storing a machine learning model; and
a neural processor circuit, comprising:

one or more neural engine circuits configured to perform at least convolution operations on input data using kernel coefficients;

a kernel interface circuit between the one or more neural engine circuits and sources including a first source and a second source, the kernel interface circuit configured to:
receive a compressed version of the kernel coefficients from the first source in a non-secure mode, and
receive the compressed version of the kernel coefficients from the second source in a secure mode;

an input interface circuit separate from the kernel interface circuit, the input interface circuit between the one or more neural engine circuits and the sources, the input interface circuit configured to:
receive the input data from the first source in the non-secure mode, and
receive the input data from the second source in the secure mode;

a neural task manager circuit comprising at a non-secure task queue and at least one secure task queue, the non-secure task queue storing non-secure references to a list of non-secure task descriptors in a system memory external to the neural processor circuit, the secure task queue storing references to a list of secure task descriptors in the system memory, each of the non-secure task descriptors indicating a configuration of the neural processor circuit for performing a corresponding non-secure task, each of the secure task descriptors indicating a configuration of the neural processor circuit for performing a corresponding secure task;

a neural processor controller configured to control operations of the one or more neural engine circuits, the kernel interface circuit and the input interface circuit; and a security controller configured to send an instruction to the neural processor controller to switch from the non-secure mode to the secure mode.

20. The electronic device of claim 19, wherein the security controller is further configured to:
determine whether the non-secure task queue is empty; and
send the instruction to the neural processor controller to switch from the non-secure mode to the secure mode responsive to the non-secure task queue being empty.

* * * * *

UNITED STATES PATENT AND TRADEMARK OFFICE
CERTIFICATE OF CORRECTION

PATENT NO. : 11,507,702 B2
APPLICATION NO. : 16/674909
DATED : November 22, 2022
INVENTOR(S) : Fishel et al.

It is certified that error appears in the above-identified patent and that said Letters Patent is hereby corrected as shown below:

In the Claims

In Column 20, in Claim 7, Line 18, delete "from the from the" and insert -- from the --, therefor.

Signed and Sealed this
Fourteenth Day of March, 2023

Katherine Kelly Vidal
*Director of the United States Patent and Trademark Office*